(12) United States Patent
Mayfield

(10) Patent No.: US 9,200,227 B1
(45) Date of Patent: Dec. 1, 2015

(54) FIRE KINDLER

(76) Inventor: Robert Nicholas Mayfield, Williams, AZ (US)

( * ) Notice: Subject to any disclaimer, the term of this patent is extended or adjusted under 35 U.S.C. 154(b) by 565 days.

(21) Appl. No.: 13/506,841

(22) Filed: May 17, 2012

Related U.S. Application Data

(60) Provisional application No. 61/571,258, filed on Jun. 22, 2011.

(51) Int. Cl.
| | | |
|---|---|---|
| *C10L 11/00* | (2006.01) | |
| *C10L 11/02* | (2006.01) | |
| *F24B 15/00* | (2006.01) | |
| *C10L 11/06* | (2006.01) | |
| *C10L 11/04* | (2006.01) | |
| *C10L 11/08* | (2006.01) | |
| *C10L 5/44* | (2006.01) | |
| *F23Q 13/02* | (2006.01) | |
| *A47J 37/07* | (2006.01) | |
| *F23Q 13/00* | (2006.01) | |
| *F23Q 13/04* | (2006.01) | |

(52) U.S. Cl.
CPC .............. *C10L 11/02* (2013.01); *A47J 37/0768* (2013.01); *C10L 5/44* (2013.01); *C10L 11/04* (2013.01); *C10L 11/06* (2013.01); *C10L 11/08* (2013.01); *F23Q 13/00* (2013.01); *F23Q 13/02* (2013.01); *F23Q 13/04* (2013.01); *F24B 15/005* (2013.01)

(58) Field of Classification Search
CPC ......... C10L 11/02; C10L 11/04; C10L 11/06; C10L 11/08; C10L 5/44; A47J 37/0768; F23Q 13/00; F23Q 13/005; F23Q 13/02; F23Q 13/04; F24B 15/005; Y02E 50/10; Y02E 50/30

USPC ..................................................... 44/522, 532
See application file for complete search history.

(56) References Cited

U.S. PATENT DOCUMENTS

| | | | |
|---|---|---|---|
| 182,087 | A | 9/1876 | Tylee |
| 201,184 | A | 3/1878 | Lewis |
| 211,085 | A | 1/1879 | Burnett |
| 213,768 | A | 4/1879 | McShane |
| 286,103 | A | 10/1883 | Wood et al. |
| 585,001 | A | 6/1897 | McDonald |
| 829,072 | A | 8/1906 | Hill |
| 2,007,694 | A | 7/1935 | Rutherford |
| 3,346,352 | A | 10/1967 | McCoy |

(Continued)

FOREIGN PATENT DOCUMENTS

| | | |
|---|---|---|
| GB | 402838 A | 12/1933 |
| GB | 839602 A | 6/1960 |
| WO | WO0018855 A1 | 4/2000 |

*Primary Examiner* — Nina Bhat
*Assistant Examiner* — Latosha Hines

(57) ABSTRACT

One embodiment of a fire-kindler which produces a solitary flame cone comprised of pre-mixed air and fuel gases and an increased flame velocity. Comfortably portable in ones' back pocket, a conveniently accessible product of easy use. More reliable in and resistant to adverse outdoor conditions when igniting a woodfire. Comprised of a geometrically shaped plate of combustible material, body of fire-kindler 8 of FIGS. 1,2 and 3 has a multiplicity of air apertures 14A-16A18A, thru, 14F-16F-18F of FIG. 2 passing therethrough. Working co-operatively to produce a strong increased flame velocity in a more neutral solitary flame. Thus establishing a more intense heat output in a more persistently sturdy flame that remains more consistently focused among adverse winds. Thereby, increasing the application of heat and the speed and ease of firewood ignition.

13 Claims, 1 Drawing Sheet

(56) References Cited

U.S. PATENT DOCUMENTS

Figure 1:
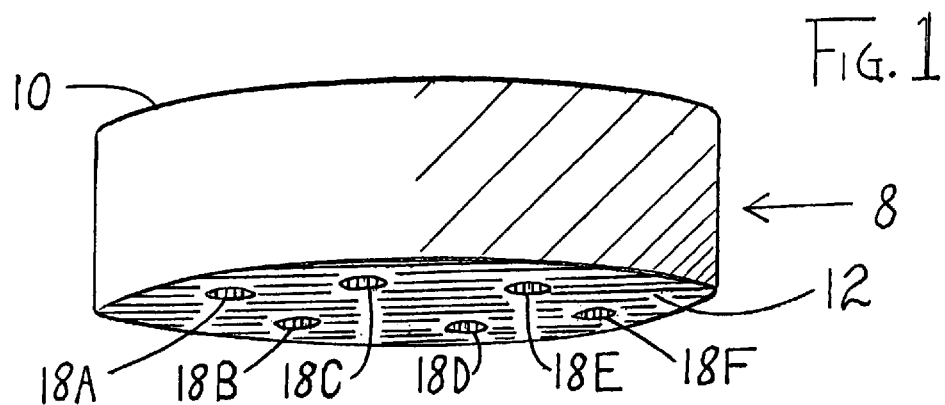

| | | |
|---|---|---|
| 4,060,396 A | 11/1977 | Burton |
| 4,116,645 A | 9/1978 | Dalzell |
| 4,460,377 A | 7/1984 | Kalil |
| 4,781,128 A | 11/1988 | Salner |
| 4,952,217 A | 8/1990 | Porter |
| 5,186,721 A | 2/1993 | Campana |
| 6,379,405 B1 * | 4/2002 | Reiger et al. .................... 44/522 |

* cited by examiner

FIRE KINDLER

CROSS-REFERENCE TO RELATED APPLICATIONS

This application claims the benefit of provisional patent application Ser. No. 61/571,258, filed 2011 Jun. 22 by the present inventor.

BACKGROUND

Prior Art

The following is a list of relevant prior art:

U.S. PATENTS

U.S. Pat. No. 18,287 September 1876 Tylee
U.S. Pat. No. 201,184 March 1878 Lewis
U.S. Pat. No. 21,185 January 1879 Burnett
U.S. Pat. No. 213,768 April 1879 McShane
U.S. Pat. No. 28,613 October 1883 Wood et. al
U.S. Pat. No. 58,501 June 1897 McDonald
U.S. Pat. No. 82,972 August 1906 Hill
U.S. Pat. No. 2,007,694 July 1935 Rutherford
U.S. Pat. No. 3,346,352 October 1967 McCoy
U.S. Pat. No. 4,060,396(A) November 1977 Burton
U.S. Pat. No. 4,116,645 September 1978 Dalzell
U.S. Pat. No. 4,460,377 July 1984 Kalil
U.S. Pat. No. 4,781,128 November 1988 Salner
U.S. Pat. No. 4,952,217 August 1990 Porter
U.S. Pat. No. 5,186,721 February 1993 Campana
U.S. Pat. No. 637,945 April 2002 Reiger Foreign Patent Documents U.S. Pat. No. 402,838(A) December 1933 GB
U.S. Pat. No. 839,602(A) June 1960 GB
U.S. Pat. No. 0,018,855(A1) May 2000 WO Those familiar with any attempt to ignite a wood-fire are aware that adverse conditions may often exist to hinder the effort. Wind and rain are common adverse conditions.

Vacationing campers will often employ rather bulky and heavy fire-kindlers. Such kindlers are awkward to carry and therefore, not conducive for hiking situations. So, they are usually used in close proximity to ones storage or vehicle.

Several types of kindlers have been proposed and air-flow is commonly considered with them. The air-flow consideration of heretofore known kindlers has been intended to permit some passage of air to facilitate self-consumption so to achieve a prolonged burn duration and assist in spreading numerous flames across a kindlers' surfaces. For example, U.S. Pat. No. 829,072 to Hill (1906) discloses exactly such an intention. Also, U.S. Pat. No. 2,007,694 to Rutherford (1935) discloses air passage to aid combustion and flame spreading so to completely consume to ash.

Some kindlers commonly disclose central channels and apertures, chimneys and flues. For example, U.S. Pat. No. 6,379,405 to Reiger, et al. (2002) discloses directing air-flow to a central aperture. However this kindler also directs air-flow outwardly. Away from the aperture, and kindler as well. Numerous seperated flames form along its perimeter, dispersing its potential heat. Also, U.S. Pat. No. 4,781,128 to Salner (1988) discloses air-flow inside a central cylindrical combustion channel so to effect the combustion of its own bulk of internal surfaces, so that it may maintain a long duration of combustion.

Many kindlers use waxes to sustain their bulk and flames. For example, U.S. Pat. No. 3,346,352 to McCoy (1967) discloses that the wax is intended to spread the flames over the articles' surface, while air-flow is not an intention. Such of this type are commonly found in local markets today and continue to share the awkward bulk and similar intentions. If cut or broken so to reduce to portable size, they become less effective. Then relying greatly upon the users' tedious and artful fire-building expertise. Although functional, the heretofore known fire-kindlers suffer from a number of disadvantages:

a) Those with bulk, heaviness, and awkward shapes are not comfortably portable. Therefore, they are not conducive to hiking, biking, hunting and other active sports, including survival type outings.

b) Their bulkiness can be relative to their operation as well. Bulky shapes produce a dispersal of potential heat. The heat is distributed along the surfaces, resulting in numerous scattered flames. These flames often wrap around firewood, delivering even less than their potential.

c) For success, the dispersed heat delivery of these fire-kindlers relies upon various attempts to prolong the duration of self-consumption. The intention being, to last long enough to hopefully ignite a wood-fire.

d) In adverse conditions, kindlers with dispersed heat sources, and those with miniscule properties are easily extinguished. They can also be unsuccessful when the wind persistently blows their heat away, or, when the firewood becomes or remains wet.

e) Kindlers which have stick shapes often become smothered in part. They are inadvertently placed under, or between, stackings of the firewood. Also, they may quickly deteriorate during operation and collapse upon themselves. Thus, they can be wasteful and unsuccessful.

f) Waxy type kindlers allow for surprising messes in transport. Becoming soft, they become misshapen and even separate unintentionally. Then, whatever their shape they continue to deliver dispersed heat from numerous flames.

g) In operation waxy kindlers can have their heat delivery become even more dispersed. Often they fall apart during operation and subsequent disintergration. Thus, spreading themselves thinner.

h) Some kindlers purposely offer little, weak flames that will rely greatly upon the user for any success.

i) Kindlers which possess very miniscule properties, such as those with strikers and flints, rely entirely upon the user for any success. Also, if comprised of moving parts they may malfunction.

j) Even when used indoors, wet wood may be encountered and the attempt may be unsuccessful.

SUMMARY

In accordance with one embodiment a fire-kindler has clean, comfortable, protective portability. Ease of ignition and use, and the ability to form a solitary flame. Comprised of an appropriately sized plate of combustible material having. a proportional thickness and geometrical shape. Thus, substantial enough to possess sufficient fuel and receive a multiplicity of mechanically introduced and arranged, approximately vertical air-flow apertures therethrough. With interior structure which will produce a venturi effect in air-flow velocity. So to produce a hotter, stronger, and enhanced solitary flame velocity that is more resistant to crosswinds.

Advantages

Accordingly several advantages of one or more aspects are as follows:

a) Desirable size, weight, and shape can be produced and packaged in comfortable pocket-sized rigid tins.

b) Potential heat is drawn together into a solitary flame. A flame cone point is developed which delivers the heat more consistently to a localized area upon a piece of firewood, placed above it. A hot-spot is created. There is less dispersal of heat.

c). Heat is focused and intensified more consistently upon the localized area. Thus, increasing a rate of entropy and greatly increasing speeds of ignition. Prolonged duration of self-consumption is not a concern.

d) Adverse conditions such as crosswinds are combated by a combined delivery of both an enhanced heat output and an enhanced flame velocity. The heat output is increased by a pre-mixing of air and fuel gases which constitute and define a more neutral flame. The flame velocity is constituted, defined, and increased by an accumulation of a plurality of venturi effected air-flow velocities. These enhancements operate to produce a strong solitary flame.

e) A firm, compact shape of 100% natural wood having stout proportions prescribes for a deliberate placement of the article.

f) The natural firmness of the combustible article and its rigid packaging, insure and protect a reliable operation of the kindler.

g) Reliable operation and the natural firmness of the wood article assures for a more consistant and complete delivery of heat by the solitary flame. Thereby allowing a hot-spot to develop upon the firewood above. Thus, avoiding undesirable heat dispersal.

h) Reliable operation produces a solitary flame of considerable size, intensity and strength. Thus, giving the user extensive assistance.

i) The extensive assistance of the reliable operation supplies most of the work needed to establish a successful wood-fire ignition. Even if the firewood is wet. The kindler has no moving parts.

j) Although well suited for outdoor conditions, these enhanced properties of the kindler can be very useful when the kindler is used in indoor fireplaces.

Other advantages of one or more aspects will be apparent from a consideration of the drawings and ensuing description.

DRAWINGS

Figures

Figure 2:
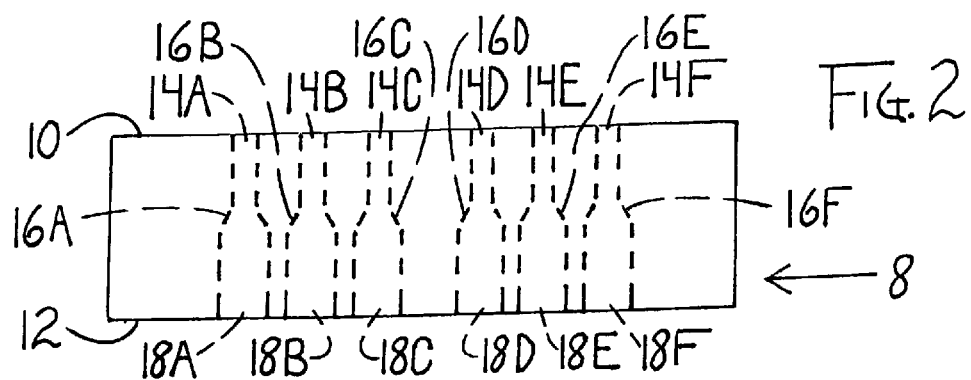
Figure 3:
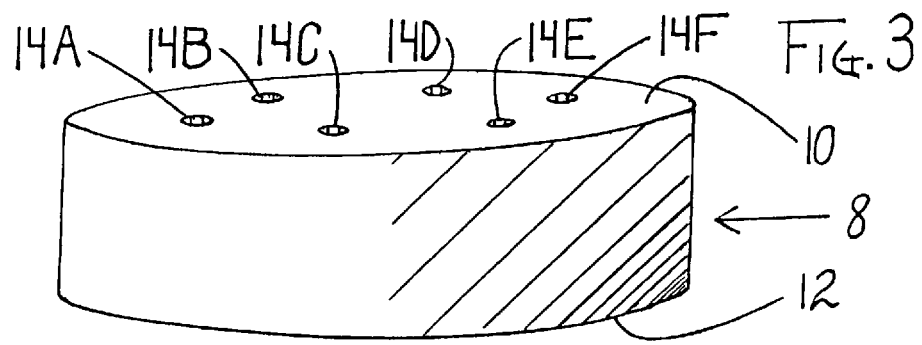

FIG. 1 is a bottom perspective view of a first embodiment.
FIG. 2 is a side elevation view of a first embodiment.
FIG. 3 is a top perspective view of a first embodiment.

REFERENCE NUMERALS

08 body of fire-kindler
10 top surface
12 bottom surface
14A upper cylindrical wall of aperture
14B ditto
14C ditto
14D ditto
14E ditto
14F ditto
16A bevelled mid-way cylindrical wall of the aperture
16B ditto
16C ditto
16D ditto
16E ditto
16F ditto
18A lower cylindrical wall of the aperture
18B ditto
18C ditto
18D ditto
18E ditto
18F ditto

DETAILED DESCRIPTION

First Embodiment—FIGS. 1,2 and 3

One embodiment of a fire-kindler is illustrated in FIG. 1, FIG. 2 and FIG. 3. Fire-kindler has a multiplicity of vertically rising air apertures which extend completely therethrough. An arrangement and plurality of which is shown, in one embodiment, at a sufficient plurality of six apertures.

Each aperture is an exact duplicate of each other aperture. A description of one aperture is exactly applicable to all apertures that exist in this one embodiment.

It is therefore described that the constituent parts of aperture 14A-16A-18A of FIG. 2 are mechanically introduced upon body of fire-kindler 8 of FIGS. 1 2 and 3 and are positioned sufficiently within its proportions. A boring tool with dimensions suitable to produce upper aperture 14A of FIGS. 2 and 3 is sent completely through body of fire-kindler 8 of FIGS. 1, 2 and 3. Having been introduced at an approximately perpendicular angle relative to top surface 10 of FIG. 2.

The boring tool is then removed and exchanged for a second boring tool which has a larger diameter than the first boring tool. This second boring tool will be suitable to produce lower aperture 18A of FIGS. 1 and 2. This second boring tool is then introduced upon bottom surface 12 of FIGS. 1 and 2 and is sent into body of fire-kindler 8 of FIGS. 1, 2, and 3 along the previously established axis of aperture 14A of FIG. 2 and stopped midway through.

Many boring tools possess inwardly bevelled cutting tip ends. Such is the case with drill bits used in this one embodiment. Therefore, when used to produce lower aperture 18A of FIGS. 1 and 2, it will simultaneously produce bevelled midway cylindrical wall 16A of FIG. 2.

Upon removal of the second boring tool, the entire interior configuration of the aperture 14A-16A-18A of FIG. 2 will be complete. And so shall it be with apertures 14B-16B-18B, 14C-16C-18C, 14D-16D-18D, 14E-16E-18E, 14F-16F-18F of FIG. 2 of one embodiment.

Other possible aperture interior configurations, are contemplated. Contemplated apertures will be considerate of proportions relating to a physical stability in a fire-kindlers' body. Also, consideration will be applied so to retain appropriate amounts of the combustible material that is indeed the kindlers' body.

The combustible material of one embodiment is cut from extremely resinous, abundantly available and non-endangered Yellow Pine or Ponderosa Pine trees.

One embodiment of combustible material is cut to approximately three inches in diameter and one inch in thickness. It may be formed by cutting transversely through tree limbs or by cutting into irregular tree stumps or trunks. Coring tools or hole saws, of appropriate size, may then produce rods or cylindrical blocks from these sources. These shapes may then be transversely cut to appropriate length for further processing, as has been described.

Operation

In operation, body of fire-kindler 8 should be elevated approximately one inch above any base surface. This may be achieved by placing body of fire-kindler 8 in a horizontal fashion between two parallel pieces of firewood, with bottom surface 12 facing down.

A firewood surface that is to be ignited should be positioned and supported so to be adjustable, approximately six inches above the kindler. In this way a forthcoming solitary flame may be located immediately below and tangent to the firewood surface.

Once prepared, a single match, or the like, is placed along any acute bottom edge of the body of fire-kindler 8. The resinous material quickly establishes combustion. The body of fire-kindler 8 becomes engulfed. The multiplicity of air apertures in bottom surface 12 also exhibit acute edges which swiftly ignite. Thus, constituting means for a co-operative updraft to be established within each aperture 14A-16A-18A, thru, 14F-16F-18F of body of fire-kindler 8.

Each updraft is co-operatively comprised of an air-flow velocity and a mixture of excess air and evolving fuel gases, which are passing therethrough.

Each aperture in one embodiment is comprised of a lower cylindrical wall of the aperture, respectively 18A, 18B, 18C, 18D, 18E, 18F which serves to receive and carry exterior excess air and exterior and interior evolving fuel gases as they are drawn into the updraft.

Each aperture also further comprised of a bevelled midway cylindrical wall of the aperture, respectively 16A, 16B, 16C, 16D, 16E, 16F which serves to smoothly direct the established air-flow in transition to a more constricted aperture, respectively 14A, 14B, 14C, 14D, 14E, 14F. Thus, producing a venturi effect as means for the air-flow velocity to increase as it passes therethrough.

With combustion in progress, pre-mixed combustible gases and the increased air-flow velocity carrying such exit each upper cylindrical wall of the aperture, respectively 14A, 14B, 14C, 14D, 14E, 14F and enter a combustion zone upon top surface 10. Thereby, co-operatively defining and constituting a more neutral flame zone and an increased flame velocity.

A pattern of arrangement of the multiplicity of apertures 14A-16A-18A, thru, 14F-16F-18F in one embodiment of body of fire-kindler 8 constitutes a cumulative means for combining the parts thereof. Each of these parts having worked to produce an individual function and now, with a cumulative effect. Each of these parts functioning to, with combustion in progress, produce individual air-flow now possessing increased velocity similar in direction to each of the others.

Now each increased velocity of air-flow continues in its direction as it emanates from top surface 10. The plurality of the now exposed air-flows become free columns of vertically rising, increased air-flow velocities and are drawn to each other as they acuminate above top surface 10. Thus, establishing a unified, strong solitary flame cone comprised of increased flame velocity and more neutral flame.

Therefore, the strong increased flame velocity serves to be more resistant to adverse winds. So to deliver a more continual and steady application of heat. While the more neutral flame serves to increase heat output with a cleaner flame.

The combined effect is now delivered more intensely, sustainablely, consistently and constantly to a relatively fixed, localized area on any firewood appropriately placed above it. So to allow the enhanced solitary flame cone to focus its tip thereupon.

Thus, a stronger, hotter solitary flame is more sturdy and remains more constantly, and returns more frequently, in adverse wind upon the localized area on the firewood.

The intensified heat output is thereby focused upon this area and a higher rate of entropy occurs there. The speed at which the firewood ignites is, therefore, increased. Even if the firewood is wet. Even if the wind blows.

CONCLUSION, RAMIFICATIONS, AND SCOPE

Thus the reader will see that at least one embodiment of the fire-kindler provides a device which functions in a manner to produce a utilitarian result. One which enables a wide range of users, skilled and unskilled, to have in their backpocket a more reliable means for igniting a wood-fire. One which supplies an enhanced delivery of the work needed for successful ignition. Even if the firewood is wet and the wind is blowing.

Although the fire-kindler is particularly well adapted for use in outdoor conditions, it is considered that it can be of important use in more benign conditions, such as indoor fireplaces.

While the above description contains many specifications, these should not be construed as limitations on the scope, but rather as an exemplification of one embodiment thereof.

Many other variations are contemplated. For example:

I can see lengthening and/or shortening the interior cylindrical walls of the apertures 14A-16A-18A, thru, 14F-16F-18F including the bevelled mid-way cylindrical walls;

I can see changing the aperture shape into a singular, cylindrical shaper

I can see changing the aperture shape into a simple conical shape;

I can see tilting apertures into various inclines;

I can see increasing or decreasing the multiplicity of apertures;

I can see additional arrangements of apertures including subsequent staggered arrangements within the same article;

I can see routing vertical grooves upon the external side surface of body of fire-kindler 8 or any plate embodiment;

I can see routing horizontal inter-aperture grooves upon bottom surface 12 of any embodiment;

I can see serrating any or all external edges;

I can see bevelling the edge of top surface 10 and/or bottom surface 12 of any embodiment;

I can see applying a 30 degree, or so, bevel to the entry of bottom surface 12 apertures of any embodiment;

I can see applying a 5 degree, or so, bevel to the exit of top surface 10 apertures of any embodiment;

I can see creating a concave top surface 10 and/or bottom surface 12 on any embodiment;

I can see creating a convex top surface 10 and/or bottom surface 12 on any embodiment;

I can see administering alternative embodiments into different types of geometrically shaped plates;

I can see administering alternative embodiments into different types of combustible materials;

I can see enlarging and/or reducing any proportions;

Accordingly, the scope should be determined not by the embodiment illustrated, but by the appended claims and their legal equivalents.

I claim:

1. A fire-kindler comprising a portable pocket-sized geometrically shaped plate having a perpendicular perimeter communication between a top surface and a bottom surface for ignition, said plate formed from a single element of combustible material wherein a plurality of mechanically introduced air apertures pass completely there through in a perpendicular direction, each of said air apertures providing a vertical cooperative updraft during combustion, each of said air apertures provide an air-flow velocity and an air and fuel gas mixture, each of said air apertures further include a substantially vertical interior configuration which includes a constricted upper portion of the aperture, wherein each of the constricted aperture upper portion providing an increase in the air-flow velocity and cooperatively provides an exited combustible premix of air and fuel gas mixture within and vertically through each of said air apertures through said plate having a pattern of arrangement with said plurality of said air apertures whereby each of the exited combustible premixes shall emanate, and ignite into a vertical flame during combustion, said pattern of arrangement providing an accumulation comprised of said flame, emanation and vertical cooperative updraft, said accumulation providing a combined delivery of a cumulative effect which is comprised of more neutral flames from the air and fuel gas constricted premixes and of the constricted increases of the flame velocities, whereby the fire-kindler will produce a unified vertical flame of said plate and draw potential heat together into a hotter and more steady solitary flame.

2. A fire-kindler according to claim 1, wherein said portable pocket-size geometrically shaped plate is a circular plate comprised of a desirable size, weight and shape so to fit into a pocket-sized rigid tin.

3. A fire-kindler according to claim 1, wherein said single element of combustible material is a 100% natural resinous wooden plate, having a perpendicularly acute bottom edge.

4. A fire-kindler according to claim 1, wherein said mechanically introduced air apertures are formed with mechanically operated drill bits.

5. A fire-kindler according to claim 1, wherein each of said air apertures passing completely therethrough having substantially vertical interior configuration comprised of the upper constituent part and a midway constituent part and a lower constituent part which provide the vertical cooperative updraft of the air-flow velocity and air and fuel gas mixture within and through the air aperture during combustion.

6. A fire-kindler according to claim 1, wherein said relatively perpendicular direction is an approximate 90 degree introduction relative to a horizontal said bottom surface of said plate, whereby a vertical disposition of the vertical cooperative updraft is constituted.

7. A fire-kindler according to claim 1, wherein said vertical interior configuration of at least one air aperture has a bottom opening which is about 50% greater in diameter than a top opening of said air aperture, whereby a venturi effect is generated within and vertically through the air aperture during combustion.

8. A fire-kindler according to claim 7, wherein the venturi effect provides an increase in the vertical cooperative updraft, whereby the air-flow velocity is constrictively increased and the air and fuel gas mixture is constrictively transitioned into a premix of said gas, so to cooperatively emanate an increased flame velocity within a more neutral flame during combustion.

9. A fire-kindler according to claim 1, wherein said pattern of arrangement is said plurality of the air aperture top openings which lie upon a suggested line within and upon said top surface of said geometrically shaped plate which follow said geometrically shaped plate's perimeter at a consistently equal interior distance from said perimeter of said geometrically shaped plate.

10. A fire-kindler according to claim 1, wherein said pattern of arrangement further including one optional said air aperture when an optional hole saw is used to produce said shape of said plate.

11. A fire-kindler according to claim 1, wherein said pattern of arrangement further including a combined delivery of a cumulative effect, whereby each ignited vertical emanation of the air and fuel gas of said premix shall combine into an accumulation with the plurality of the venturi effected air-flow velocities, so that said combined delivery draws the vertical flames of said combustible material of said fire-kindler plate into a unified flame cone, thus drawing potential heat together into a more neutral and more sturdy solitary flame during combustion.

12. A fire-kindler according to claim 11, wherein said unified flame cone defines a solitary flame which is comprised of higher heat output and more wind resistant steadiness, whereby said wind resistant steadiness delivers said potential heat more consistently upon a localized area of firewood placed above said fire-kindler during outdoor conditions of combustion.

13. A fire-kindler comprising a portable pocket-size geometrically shaped plate having a horizontal exterior top surface parallel to a horizontal exterior bottom surface, the horizontal exterior surface having a uniform perpendicular perimeter communication with each other, said perpendicular perimeter communication completing an exterior conformation of a body of said fire-kindler, said fire-kindler formed from a single element of combustible material wherein a plurality of air apertures pass completely therethrough in a relatively perpendicular direction to the horizontal exterior surface, the air aperture having a vertical interior configuration providing a vertical combustible air-flow emanation during combustion, the interior configuration having a proportionally sized aperture upper constituent part so to increase a velocity of the vertical combustible air-flow emanation, said top surface having a pattern of arrangement of said plurality of said air apertures, said pattern of arrangement providing an accumulation of the plurality of ignited vertically rising cooperative updraft emanations, said accumulation having a cumulative effect, said cumulative effect providing a unified draw of vertical flame acumination of said combustible material of said fire-kindler during combustion.

\* \* \* \* \*